Figure 1:
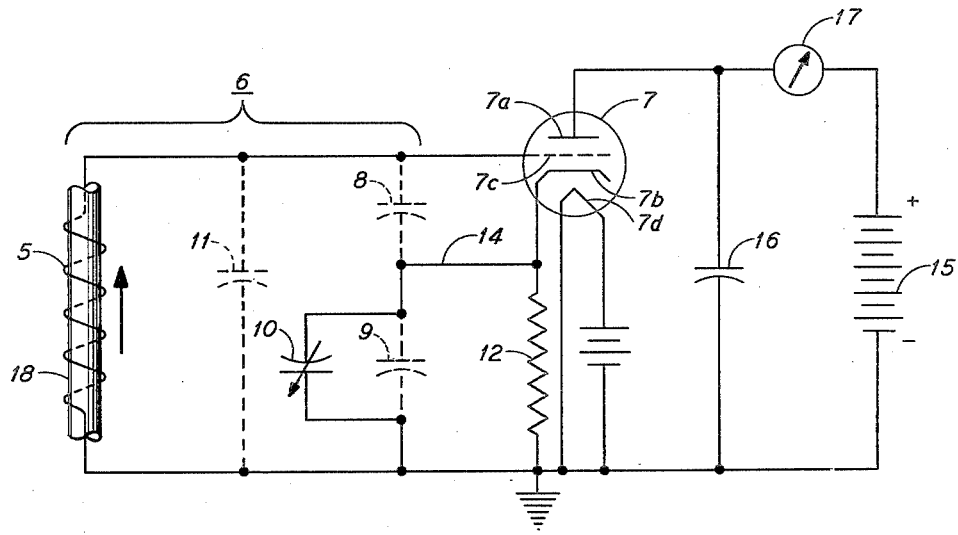

Nov. 27, 1956  V. C. DAVIS  2,772,393

WATER-IN-OIL DETECTOR

Filed Dec. 23, 1952

INVENTOR
VINCENT C. DAVIS
BY
ATTORNEYS

United States Patent Office 2,772,393
Patented Nov. 27, 1956

2,772,393

WATER-IN-OIL DETECTOR

Vincent C. Davis, Oakland, Calif., assignor to California Research Corporation, San Francisco, Calif., a corporation of Delaware Application December 23, 1952, Serial No. 327,553

1 Claim. (Cl. 324—40)

This invention relates in general to electrical detecting and indicating devices and, in particular, to detecting and indicating devices for contamination of oil by an electrolyte, such as water, utilizing resonant circuits.

In the electrical art it is well known to utilize a resonant circuit sensitive to variations in an electrical property of a substance for detecting variations in that property as a measure of a change in the composition of the substance. Such circuits are utilized in radio frequency titration, the measurement of electrical losses in dielectrics and in many other applications.

The substance to be tested is placed in the alternating field of the resonant circuit so that variations in the composition of the substance, as reflected by variations in the electrical properties of the substance, vary the resonant properties of the circuit to provide an electrical indication of the variation. The substance may be placed either in the magnetic field or the electrical field of the circuit to vary the electrical losses of the circuit in dependence upon variations in the electrical properties of the substance components.

In some of such prior art devices, such as a radio frequency titrimeter, the resonant circuit is coupled to, or is a part of, a conventional feedback type of oscillator which is adjusted to be oscillating at a low value under predetermined conditions in the tested substance and which decreases in amplitude of oscillation upon a variation from this predetermined condition.

This type of device has the disadvantages that it is difficult to accurately adjust the oscillator to the desired low degree of oscillation, and that when once adjusted, slight variations in loading or other conditions may cause the oscillations to stop, thereby necessitating the readjustment of the components.

The present invention teaches a means for overcoming these disadvantages by utilizing an oscillator in which the amplitude of the oscillations is at a maximum under the predetermined conditions and in which the oscillation amplitude decreases without rapid loss of sensitivity upon variations from the predetermined conditions. One of the most suitable of such oscillators comprises an electric valve connected similarly to the well-known cathode follower circuit and to the grid circuit of which is connected the resonant detecting circuit.

It is, therefore, an object of this invention to provide an electrical detecting and indicating device utilizing a resonant circuit coupled to the grid of an oscillator having a resistance connected in the cathode circuit thereof said resistance being common to both the detector and indicator circuits of said oscillator to increase its sensitivity.

It is also an object of this invention to provide an improved electrical detecting and indicating device.

It is an additional object of this invention to provide an electrical detecting and indicating device utilizing an oscillator which is easily adjustable and extremely sensitive.

It is a further object of the present invention to provide an electrical indicating and detecting device which is rugged, simple and easy to manufacture.

Figure 2:
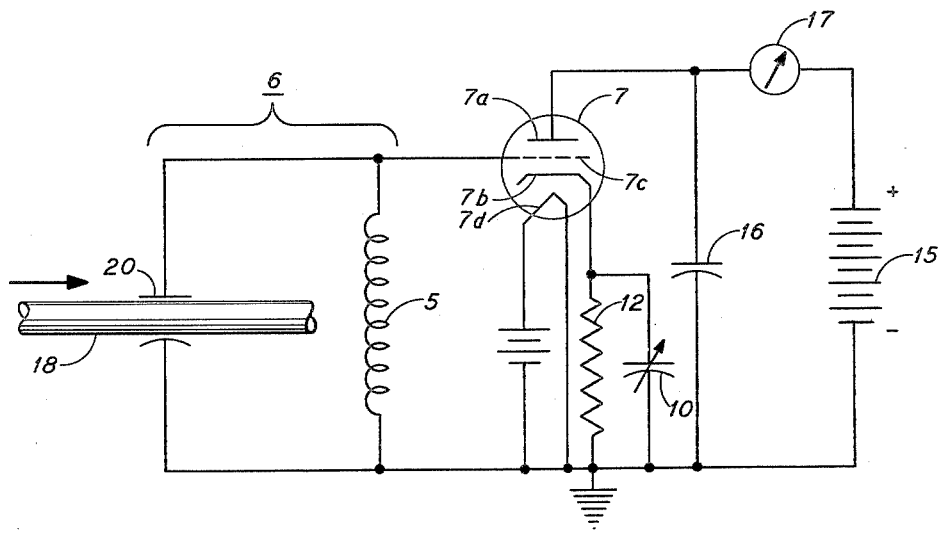

Objects and advantages other than those described above will be readily apparent from the following description when read in conjunction with the accompanying drawing, in which:

Figure 1 diagrammatically illustrates the circuits and apparatus of one exemplary embodiment of the invention in which the tested substance is placed in the alternating magnetic field of the resonant circuit, and Figure 2 diagrammatically illustrates the circuits and apparatus of an alternate exemplary embodiment of the invention in which the tested substance is placed in the alternating electric field of the resonant circuit.

Referring to Figure 1 of the drawing by character of reference, 5 designates an electromagnetic inductance coil forming part of a resonant circuit 6 which is connected to an electric valve 7 having an anode 7a, a cathode 7b, a grid 7c and a cathode heater 7d. The other portion of resonant circuit 6 comprises suitable capacitance means which may be in the form of separate capacitors or may, as shown, be in the form of the interelectrode capacitance, represented by capacitor 8, between grid 7c and cathode 7b, the interelectrode capacitance represented by capacitor 9, between cathode 7b and ground, and the distributed capacitance of the coil 5 and its associated wiring, represented by capacitor 11, between grid 7c and ground. The interelectrode capacitance 9 between ground and cathode 7b may be shunted by additional capacitance, such as a separate adjustable capacitor 10, to provide for adjustment of the resonant properties of circuit 6 under varying operating conditions.

Valve 7 is connected similarly to a cathode follower by connecting a resistor 12 between cathode 7b and a grounded reference terminal. The junction of resistor 12 and cathode 7b is connected by a conductor 14 to the common terminal of capacitors 8, 9 and 10 to cause capacitor 8, together with parallel connected capacitors 9 and 10, to form a capacitive voltage divider between grid 7c, cathode 7b and ground.

A suitable source of plate current, such as battery 15, is connected between anode or plate 7a and the grounded end of cathode resistor 12. A bypass capacitor 16 may be connected between anode 7a and ground in parallel with battery 15 to maintain anode 7a at essentially zero alternating potential with respect to ground. Suitable current indicating means are connected in series with valve 7 and the source of anode current, and such indicating means may comprise any suitable known recorders or other types of indicators. However, for the sake of simplicity, I have shown a milliammeter 17 connected in series with anode 7a and battery 15 for indicating variations in the direct component of the plate current of valve 7.

The substance to be tested may be inserted in the field of coil 5 in individual batches, but preferably the substance is tested on a continuous basis. For example, in the detection of water in fuel oil, the oil and water mixture is passed through a pipe 18 which is disposed in the magnetic field of coil 5. Pipe 18 is made of any suitable material having a low electric loss, for example Pyrex, quartz or a synthetic resin. Coil 5 may be placed around pipe 18, but preferably the coil is disposed inside pipe 18 to thereby obviate any interference with the magnetic coupling between coil and test substance.

The device is calibrated, for this exemplary testing operation, by filling the portion of pipe 18 which is within the magnetic field of coil 5 with oil which is not contaminated with water or other foreign ingredients. Capacitor 10 is then adjusted to produce a desired amplitude of oscillation in resonant circuit 6. Under these conditions, the amplitude of the radio frequency oscillations in valve 7 is at a predetermined value to produce a predetermined current through valve 7 and thereby produce a maximum deflection of meter 17.

After calibration, the mixture of oil and water to be tested may be passed continuously through pipe 18 at a suitable speed. As long as only oil is within the magnetic field of coil 5, the amplitude of the oscillations in valve 7 remain at the predetermined value. However, if water is present in the oil within the magnetic field of coil 5, the magnetic field will cause increased electrical losses in the water with respect to the electrical losses in the pure oil. This increase will be especially marked where the water has a high mineral content and consequent low resistivity. The above-described increased losses absorb increased energy from coil 5 so that the amplitude of oscillations in circuit 6 decreases. This, in turn, decreases the amplitude of the oscillating current in valve 7 to thereby decrease the amount of the direct current flowing therethrough, as indicated by meter 17. Thus, the device operates to detect very minute quantities of water in oil and to give an indication of such detection on meter 17.

It will be understood that the characteristics of the component parts of the embodiment of Fig. 1 are susceptible of wide variation without departing from the spirit of the invention. In one exemplary embodiment, the component parts have the following values:

| | |
|---|---|
| Coil 5 | 10 microhenries. |
| Tube 7 | 12 AT 7. |
| Resistor 12 | 20,000 ohms. |
| Battery 15 | 250 volts D. C. |
| Capacitor 16 | .01 microfarad. |

In the embodiment illustrated in Figure 2, the resonant circuit 6 comprises inductance coil 5 and a suitable capacitor 20. Capacitor 20 may be of the type having plates formed by two or more concentric pipes between which the tested material flows, or may, as shown, be adapted to receive between the plates thereof pipe 18 or some other suitable container for the substance being tested. Resonant circuit 6 is connected in the grid circuit of valve 7 as in the embodiment of Figure 1. For the purpose of detecting the presence of water in oil, for example, the device is calibrated by filling pipe 18 with a pure sample of the oil to be tested and adjusting trimmer capacitor 10 so that circuit 6 is resonant to produce oscillations of predetermined amplitude in valve 7 and maximum deflection of meter 17. Then, if water appears in the oil which is within the electric field of capacitor 20, the variation in the dielectric losses of the material between the plates of capacitor 20 occasioned by the presence of the water will vary the dielectric losses of capacitor 20. This action causes the amplitude of the oscillations in valve 7 to decrease to thereby decrease the direct current through meter 17 and thus provide on meter 17 an indication of the presence of the water.

Although but two embodiments of the present invention have been illustrated and described, it will be apparent to those skilled in the art that various changes may be made therein without departing from the spirit of the invention or from the scope of the appended claim. In particular, it will be apparent that resonant lines or a resonant cavity may be utilized as a resonant circuit if the frequency is of sufficient magnitude. Additionally, it will be apparent that the device of this invention may also be utilized in many other applications such as an indicator of moisture in gas streams, as an indicator of the dissipation factor of varying substances, and in radio frequency titration.

I claim:

A water-in-oil detector for a conduit conveying oil, consisting of an inductance coil, capacitance means connected to said coil to form a resonant circuit, said conduit passing through the field of said resonant circuit so that the presence of water therein will increase the electrical losses and thereby vary the resonant properties of said circuit, an electric valve having an anode, a cathode and a grid, a grounded terminal, resistance means connecting said cathode and said terminal, a source of direct current for said anode, a variable capacitor shunting said resistance means, means connecting said resonant circuit between said grid and said terminal to vary the anode current of said valve in accordance with changes in said resonant circuit, and a direct current indicator in series with said anode, said current source and said terminal so constructed and arranged that oscillations in said resonant circuit and the magnitude of said anode current are at a maximum when oil is present in said conduit, and decrease sharply when water is present in said oil.

References Cited in the file of this patent

UNITED STATES PATENTS

| | | |
|---|---|---|
| 1,815,717 | Kranz | July 21, 1931 |
| 2,071,607 | Bjorndal | Feb. 23, 1937 |
| 2,272,851 | Ramsay | Feb. 10, 1942 |
| 2,298,629 | Schaper | Oct. 13, 1942 |
| 2,352,011 | Rosa et al. | June 20, 1944 |
| 2,447,375 | Taylor et al. | Aug. 17, 1948 |
| 2,573,172 | Ennis et al. | Oct. 30, 1951 |
| 2,576,173 | Cornelius | Nov. 27, 1951 |
| 2,599,583 | Robinson et al. | June 10, 1952 |
| 2,617,299 | Ennis et al. | Nov. 11, 1952 |
| 2,627,539 | Tompkins | Feb. 3, 1953 |